United States Patent

Gammelgaard

[11] Patent Number: 5,207,031
[45] Date of Patent: May 4, 1993

[54] APPARATUS FOR USE IN RENOVATION OF TUBE SYSTEMS, IN PARTICULAR SEWER TUBE SYSTEMS

[76] Inventor: Kresten Gammelgaard, Egevaenget 18, DK-7850 Stoholm, Denmark

[21] Appl. No.: 775,962
[22] PCT Filed: Apr. 26, 1990
[86] PCT No.: PCT/DK90/00109
 § 371 Date: Oct. 28, 1991
 § 102(e) Date: Oct. 28, 1991
[87] PCT Pub. No.: WO90/12979
 PCT Pub. Date: Nov. 1, 1990

[30] Foreign Application Priority Data
Apr. 26, 1989 [DK] Denmark .............. 2013/89

[51] Int. Cl.[5] .................. B24B 5/40; E21B 29/00
[52] U.S. Cl. .................. 51/245; 51/241 S; 51/170 R; 15/104.09; 409/143; 30/379
[58] Field of Search ......... 51/170 R, 170 T, 170 PT, 51/241 R, 241 S, 245; 15/104.09, 104.31, 104.05; 409/143; 166/55, 55.6, 55.7; 30/103, 105, 379, 379.5

[56] References Cited

U.S. PATENT DOCUMENTS

| | | | |
|---|---|---|---|
| 1,289,604 | 12/1918 | Baker | 30/379 |
| 3,230,668 | 1/1966 | Stanley | 51/170 R |
| 4,630,676 | 12/1986 | Long, Jr. | 409/143 |
| 4,785,512 | 11/1988 | Sigel | 409/143 |
| 5,056,269 | 10/1991 | Westman | 51/245 |

FOREIGN PATENT DOCUMENTS

| | | |
|---|---|---|
| 0084427 | 7/1983 | European Pat. Off. . |
| 3446055 | 6/1986 | Fed. Rep. of Germany ...... 409/143 |
| 3602281 | 1/1989 | Fed. Rep. of Germany . |
| 7609567 | 8/1979 | Sweden . |

Primary Examiner—Roscoe V. Parker
Attorney, Agent, or Firm—Antonelli, Terry, Stout & Kraus

[57] ABSTRACT

An apparatus for use in renovating tube systems, in particular, sewer tubes of a circular cross section. The apparatus includes a frame on wheel, with the frame being arranged so as to be moved inside a tube in such a manner that a position of the apparatus in the tube is determined. A motor-driven tool is arranged for cutting away items extending or protruding into the tube and/or for forming side openings in the tube wall or in a tube lining. The motor driven tool is mounted on a carrier arm extending beyond an end part of a rotatable portion of the apparatus. The carrier arm is pivotally connected, opposite the tool, to the rotatable portion at a distance from the end part thereof. An inflatable lifting member is arranged inside the rotatable portion between the end part of the rotatable portion and the pivot axis of the carrier arm. The lifting member is interposed between the rotatable portion and the carrier arm in such a manner that the tool can be moved diametrically within the tube. A turning motor is interposed between the frame and the rotatable portion.

8 Claims, 5 Drawing Sheets

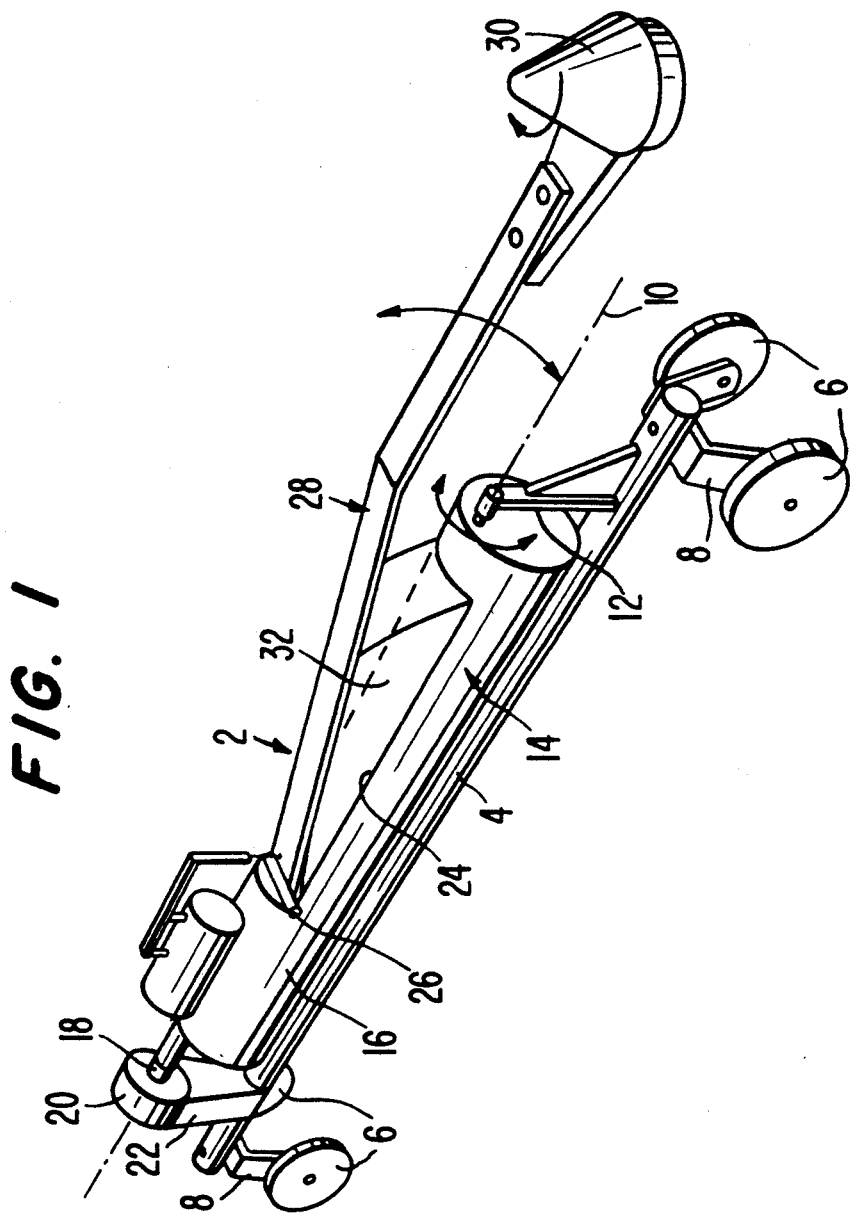

APPARATUS FOR USE IN RENOVATION OF TUBE SYSTEMS, IN PARTICULAR SEWER TUBE SYSTEMS

FIELD OF THE INVENTION

The present invention relates to an apparatus for use in renovating tube systems, and, in particular, sewer tube systems.

BACKGROUND OF THE INVENTION

In the renovation of sewer tube systems it was previously necessary to exchange damaged sewer tubes with entirely new sewer tubes, which encompassed major costs and possibly troublesome digging work which additionally disturbs the surroundings. Today a newer method of renovation is applied more and more, provided that damaged sewer tubes have the required capacity, wherein the existing sewer tubes are provided in situ with a tube lining comprising a plastics lining which is, for example, formed from a plastics strip which is wound up and assembled inside the sewer tube by special methods and apparatus. It should be remarked that a plurality of accepted methods are known for renovating sewer tube systems by means of an inner lining.

A mandatory prerequisite for applying the new renovation method as mentioned is, at least if sewer systems are concerned which do not allow personal access, the development of small mobile TV cameras such that one may part inspect, prepare and measure up the existing sewer system precisely and part reestablish the positions, precisely as well, at which side openings must be formed again in the plastics lining.

More specifically the invention relates to an apparatus which is primarily developed for use in renovation of sewer tubes, for example, according to the method as mentioned above wherein a plastics liner is formed by winding up inside an existing sewer tube. Admittedly, apparatus are known which are meant to serve the same purpose; but to some extent these known apparatus are very clumsy and complicated in their construction and, consequently, they are rather costly. Furthermore the known apparatus for the purpose mentioned are so large that in practice they can only be used in relatively large sewer tubes.

EP-A-0 084 427 discloses an apparatus for use in renovating sewer tubes and comprising a cylindrical apparatus body adapted to be moved inside a tube in such a way that the position of the apparatus in the tube is known, and a motor-driven tool wherein the motor-driven tool is mounted on a carrier member which protrudes from an end portion of the apparatus body and is journaled so as to be rotatable with respect to the apparatus body around a longitudinal axis. Opposite the apparatus body, the carrier member comprises a lifting mechanism which is interposed between a free end of the carrier member and the tool in such a way that the tool on the latter can be moved diametrally within the tube. Furthermore this known apparatus comprises a turning motor which is interposed between the apparatus body and the rotatable carrier member.

SUMMARY OF THE INVENTION

It is a purpose of the invention to provide an apparatus of the initially mentioned type and which, despite of the fact that it utilizes simple means and a simple and economical construction, may lead to an improved precision and efficiency, for example, in the method of renovation.

The apparatus according to the invention is distinctive in that the carrier member includes a carrier arm made of springy material, for example, spring steel, and is pivotably connected, opposite the tool, to the rotatable portion at a distance from the end part thereof, and that the lifting member is interposed between the end part of the rotatable portion and the pivot axis of the carrier arm, with the pivot axis being perpendicular to the longitudinal rotation axis of the rotatable portion. Thus, an efficient and easily operated apparatus is attained by simple means, which can be used in a safe and precise way, utilizing the tool, for working in principle on any part of the wall of a sewer tube or a tube lining, depending on the type of tool which is arranged at the extreme end of the carrier arm. The latter can itself be moved diametrically within the tube but, as the carrier arm is furthermore arranged to extend from the portion which with respect in relation to the frame, the tool on the carrier arm can also be moved around along the periphery of, for example, the lining wall, by turning the rotatable portion in relation to the frame.

In a preferred embodiment, the apparatus according to the invention is expediently arranged such that the rotatable, portion includes a mainly horizontally positioned cylindrical hollow part formed with an elongated upper opening, with the carrier arm extending above and along the opening from the pivot axis at an end of the opening and further on beyond the end part of the cylindrical part. The lifting member includes an inflatable, elastic body which is arranged inside the cylindrical part, and cooperates with the carrier arm via the elongated opening for swinging the former outwardly by inflation of the elastic body. For swinging the carrier arm back by withdrawal of air from the inflatable body, the carrier arm is preferably spring-loaded towards the inflatable body.

With a view to guiding the radial or diametrical movement of the tool more easily and to be able to more easily monitor the engagement area of the tool and its working operation at the extreme end of the carrier arm, the latter may be advantageously curved or bent into such a shape that the tool at an extreme end of the carrier arm may be placed on a level with or below the upper opening of the rotatable portion.

BRIEF DESCRIPTION OF THE DRAWINGS

The invention will be more closely explained below with reference to the drawing, wherein:

FIG. 1 is a perspective view of an embodiment of an apparatus according to the invention.

DETAILED DESCRIPTION

Figure 1A:
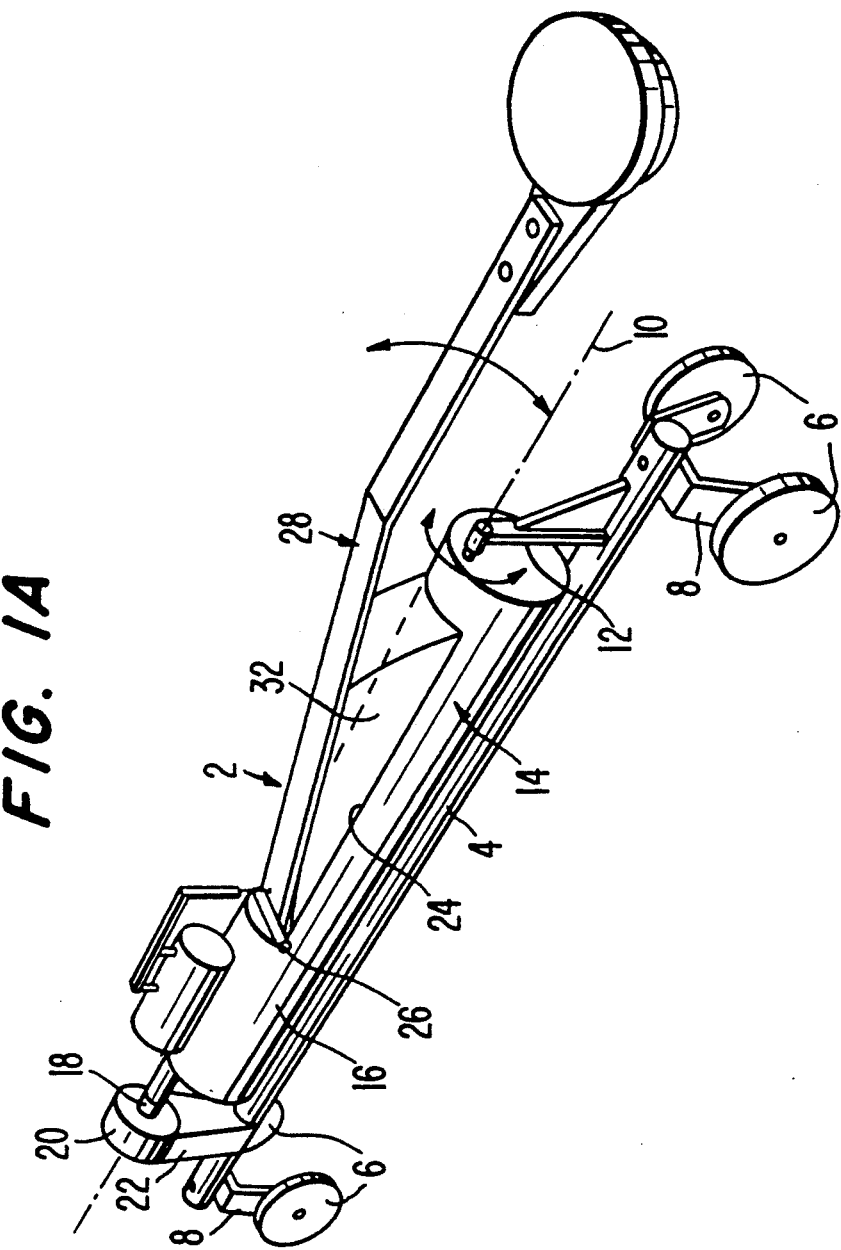
FIG. 1A is a perspective view of another embodiment of a tool for use with the apparatus of the present invention.

The renovating apparatus generally designated by the reference numeral 2 as shown has a frame 4 which comprises a solid steel rod so as to form a stable base with a low center of gravity, and which is provided with wheels 6 on exchangeable wheel bogies 8. Thus, the apparatus 2 may, in a simple way, be equipped for use in renovating sewer tubes with diameters from 170 mm–1000 mm, inasmuch as a longitudinal axis of rotation 10 of the apparatus 2 may be placed substantially level with the longitudinal axis of the sewer tube by exchanging the wheel bogies 8 and/or the wheels 6.

The frame 4 has a foremost upright bearing console 12 for a rotatably suspended portion 14 which comprises a cylindrical tube body 16, and which is nonrotatably connect opposite of the bearing console 12 to a motor shaft 18 of a turning motor 20 which is fixed to the frame 4 by an upright bracket 22. The turning motor 20 preferably comprises a watertight, reversible low-voltage motor, for example, of the same type as a known turning motor for turning a TV antenna by slow rotation of the vertical carrier tube. The turning motor 20 is controlled by a special potentiometer with a so-called slave scale, that is, the turning motor runs until the TV antenna has the same direction as the setting on the controlling scale.

Approximately level with the axis of rotation 10 the cylindrical tube body 16 is formed with an upper, elongated opening 24. Adjacent the back end of the opening 24, a carrier arm 28 is pivotably journaled on a transverse pivot axis 26, with the arm 28 extending above and along the opening 24 and onward a distance forward in front of the apparatus 2. As shown the carrier arm 28 is angularly bent downward at about the end of the rotatable cylindrical body 16, such that a motor-driven, preferably, pneumatically driven tool 30 at the extreme end of the carrier arm 28 can be moved diametrically within the sewer tube, by swinging the former in relation to the tube body 16, from a position in front of the apparatus 2 to a position at a wall part of the sewer tube.

Inside the tube body 16 an inflatable elastic body 32 is arranged which preferably includes a sturdy inflatable cylinder device which is normally used for temporary end closure of conduit tubes, that is, a cylindrical elastic body which can be jammed like a cork in an end of a tube by means of inflation with air. During inflation of the elastic body 32 a side part of it cooperates via the opening 24 with the lower side of the carrier arm 28 such that the latter is swung outward relative to the tube body 16 and swung in towards the upper side of the tube body 16 when the elastic body 32 is deflated.

A bracket 34 for a TV camera is provided at the upper side of the body behind the pivot axle 26 of the carrier arm 28. The TV, mounted camera in front of the apparatus 2 monitors the inside of the sewer tube for controlling the movement of the carrier arm 28 and the tool 30. The bracket 34 is provided with an indicator arrangement 36 with a pendulum indicator 38 which is rotatably mounted in front of a center axis of the TV camera, such that a given angular position of the rotatable portion 14 can be read off an angle scale along the periphery of the camera lens as the pendulum indicator 38 will remain vertical when the rotatable portion 14 is rotated around the axis of rotation 10.

Figure 2:
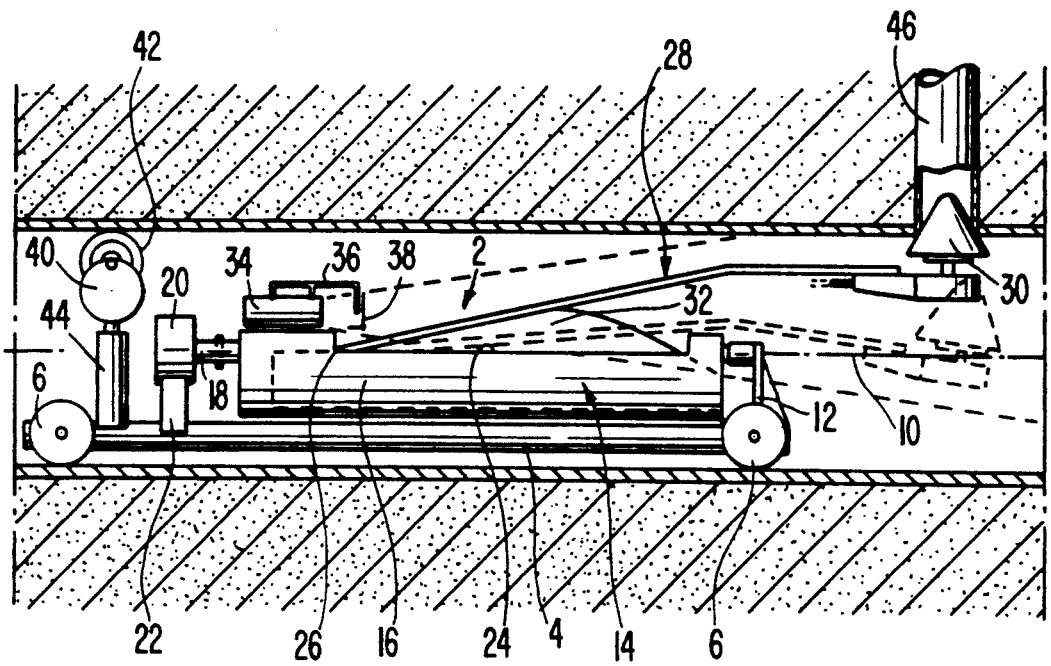
FIG. 2 is a longitudinal section of a sewer tube showing an apparatus according to the invention.
Figure 3:
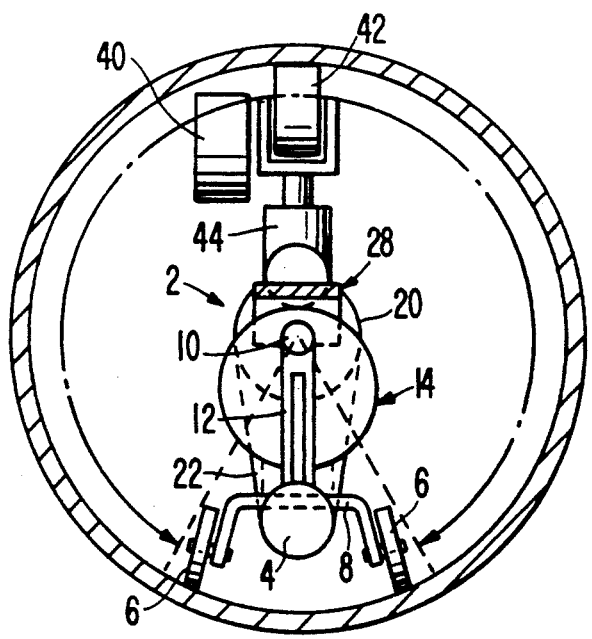
FIG. 3 is a transverse section of a sewer tube showing an apparatus according to the invention.

The apparatus 2 may be intended to be moved along the sewer tube by a separate wire pulling system with a measuring tape for determining the exact position of the apparatus along the tube; but the apparatus 2 may also, cf. FIG. 2 and 3, be provided with a driving motor 40 with a frictional drive wheel 42 which can be pressed against the sewer tube wall opposite the wheels 6 by a preferably pneumatic cylinder 44, whereby the exact position of the apparatus 2 along the tube may still be determined a measuring tape.

By turning the rotatable portion 14 around the axis of rotation 10, as shown in FIG. 3, the tool 30 of the apparatus can be used for working on the tube wall or the inside of the sewer tube along an angular sector of about 300° which is limited only by the front wheels 6 and wheel bogie 8. In practice, however, the carrier arm 28 will be able to serve the remaining lower 60° of the sewer tube wall as well, by preventing the carrier arm 28 to engage, as shown in FIG. 2, an inlet tube 46 while the turning motor 20 is activated so that the entire apparatus 2 is moved sideways on the lower portion of the tube wall while it is supported on the wheels 6. In this slightly inclined position the frictional drive roller 42 may assist in maintaining the apparatus 2 in position inside the tube, and generally it may be an advantage if the apparatus comprises support rollers proper which permanently abut the "ceiling" of the sewer tube.

Figure 1B:
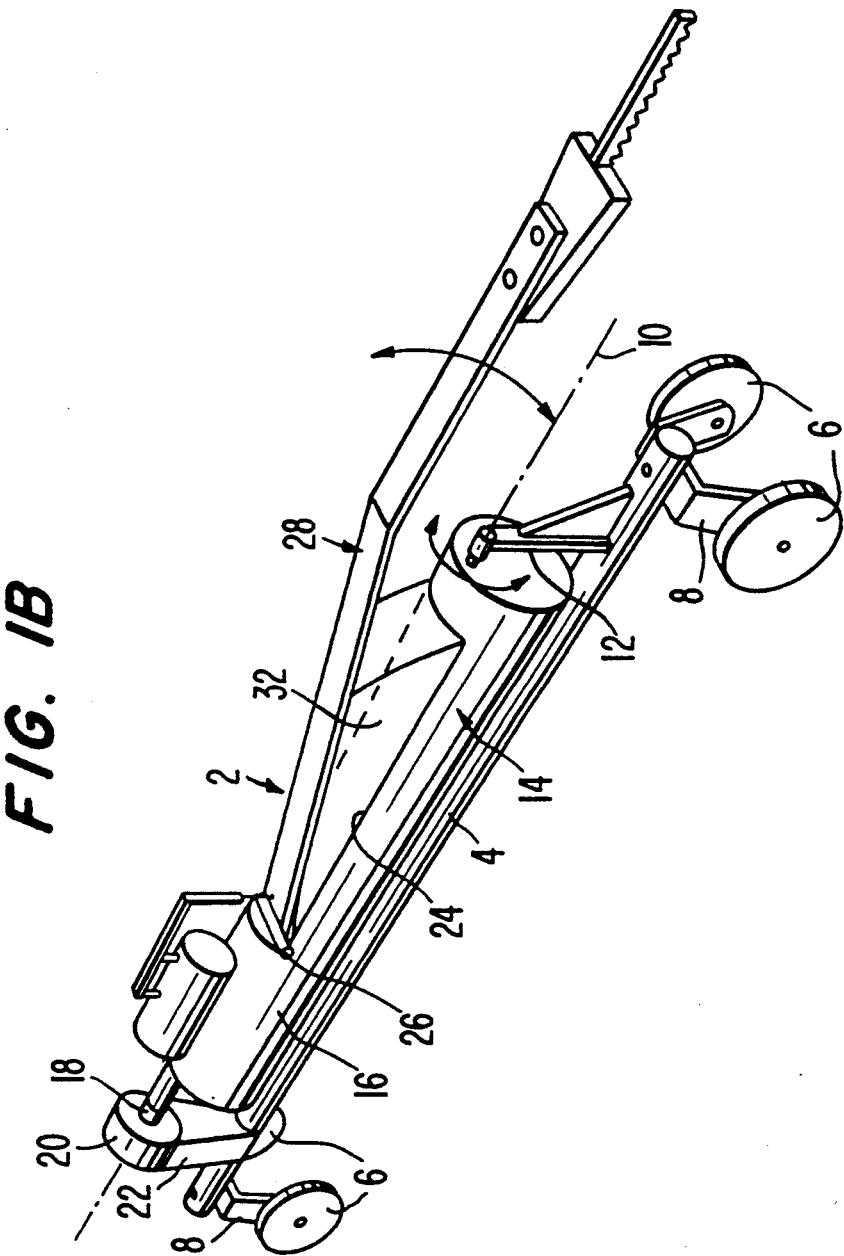
FIG. 1B is a perspective view of a further embodiment of the tool for use with the apparatus of the present invention.

Besides the tool 30 as shown, which consists of a grinding cone of plastics material (technical grade nylon), the apparatus 2 may operate with a common flat cutting or sanding disc 303 (FIG. 1A) and possibly with a reciprocating sawblade 30b (FIG. 1B) which runs in extension of the carrier arm 28, and with other appropriate tools.

If, according to its primary purpose, the apparatus according to the invention is used for renovation of sewer tubes to be provided with a plastics lining wound up on location, the existing sewer tube is measured and prepared by the apparatus 2. The latter is first moved through the sewer tube to cut away possible roots and other inwardly protruding parts, for example tubing stubs of branching tubes, and the same time, a precise measurement and registration of all branching connections both their position along the tube and their angular position is made by recording a video tape which is used later on, that is, when the plastics lining is fitted along the inner wall of the sewer tube, for reestablishing the connections with the registered branching tubes by means of suitable tools, for example, the cutting cone 30.

Figure 4:
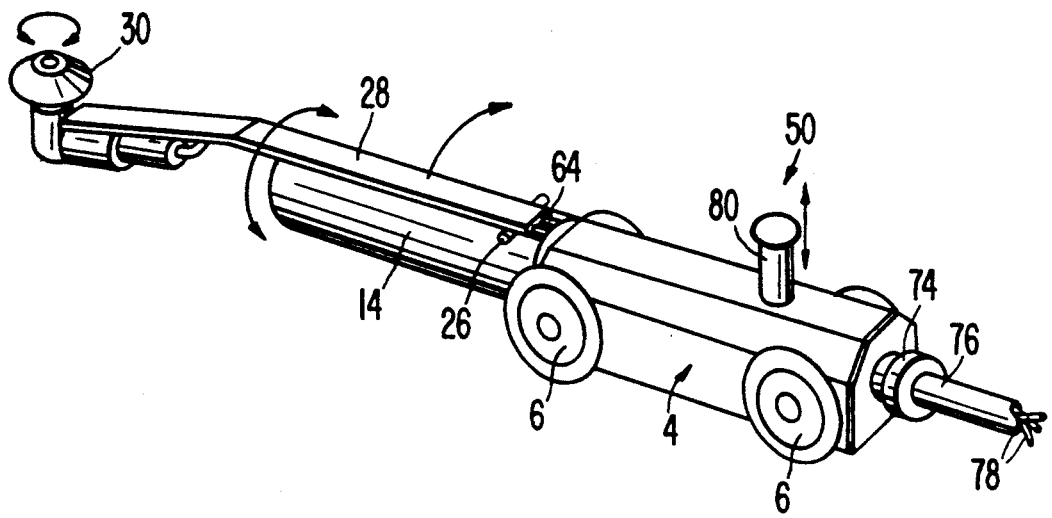
FIG. 4 is a prespective view of a preferred embodiment of an apparatus according to the invention.
Figure 5:
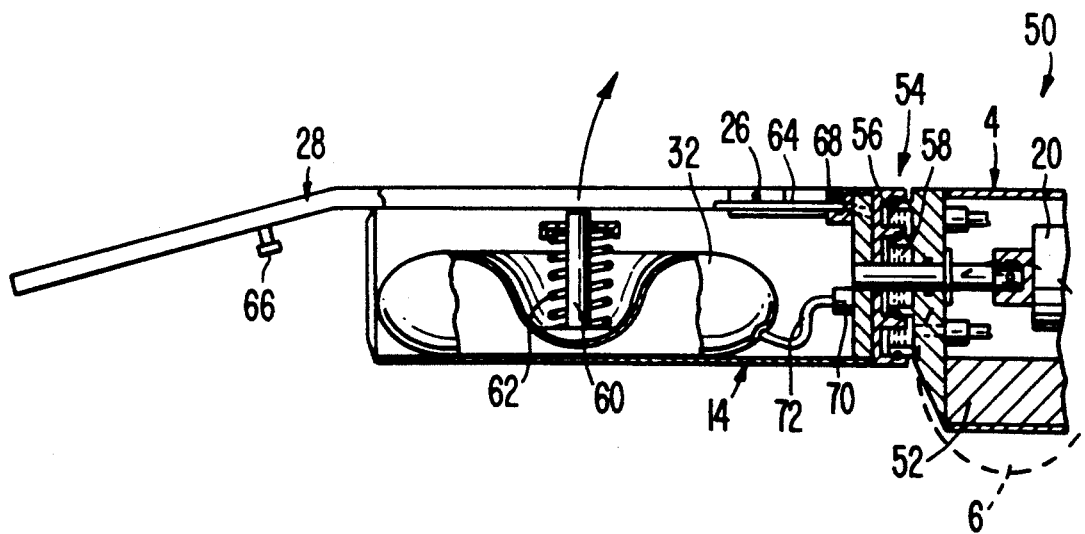
FIG. 5 is a side view, part in section, of a rotatable cylindrical portion of the apparatus according to the invention shown in FIG. 4.

In a further embodiment of the present invention, as shown in FIGS. 4 and 5, a sewer robot apparatus 50 may be dimensioned in size to work in very narrow surroundings, for example, sewer tubes with an inner diameter down to as low as about 100 mm, with the sewer apparatus comprising a frame 4 which is provided with wheels 6 and with an inside ballast 52 and turning motor 20 (FIG. 5). The turning motor 20 actuates a rotatably suspended cylindrical portion 14 which is connected to the frame 4 by a special rotational link 54 with ring-shaped connecting spaces 56 and 58 through which a portion of pressurized air is supplied to the tool 30 on the carrier arm 28 and a portion to the inflatable body 32 which is placed inside the portion 14. The inflatable body 32 actuates the carrier arm 28 via a special actuator part 60 with a compression spring 62. The carrier arm 28 is hollow so as to allow running a supply line 64 for the tool 30 from the pivot axis 26 to an outer connecting stub 66 in protection within the carrier arm 28. For an easy exchange of the carrier arm 28 with the tool 30, a free end of the supply line 64 may be connected with the ring-shaped connecting space 56 by tucking it into a connector fitting 68. A similar tuck-in fitting 70, connected with the ring-shaped connecting space 58, may be provided for a supply line 72 to the inflatable body 32 so that the latter is likewise easy to exchange. The rotational link 54 enables the apparatus 50 to execute continuous rotations of the cylindrical portion 14, that is, the tool 30 can operate on the entire inner wall of the 360° of a sewer tube.

Opposite the rotatable cylindrical portion 14, the frame 4 is provided with a pipe connector 74 for a flexible supply pipe 76 through which air pipes 78 and possibly electric supply lines can be led to the hollow of the frame. The apparatus 50 is not provided with an independent driving motor; instead the apparatus 50 is intended to be coupled to a camera trolley, placed in front of the tool 30, which can be provided with a driving motor, and which can be used as a tractor for the apparatus 50. Otherwise the latter can be pulled along the sewer tube by a pulling wire or possibly the apparatus 50 can be pushed forward within the sewer tube by the supply pipe 76. Furthermore the frame 4 is provided with a holding cylinder with a telescopic piston 80 for fixing the apparatus 50 against the "ceiling" of the sewer tube in the work position.

The inflatable body 32 may be exchanged for an actuator cylinder positioned like the actuator part 60, so that the overall length of the apparatus 50 is reduced enough to enable the apparatus to operate in curved sewer tube sections.

What is claimed is:

1. Apparatus for use in renovating tube systems, in particular sewer tubes of circular cross section, the apparatus comprising:
    an apparatus body or a frame on wheels, said apparatus body or frame being adapted to be moved inside a tube in such a way that the position of the apparatus in the tube is known;
    a motor-driven tool mounted on a carrier member and extending beyond an end part of a rotatable portion of the apparatus, said rotatable portion being journal led so as to be rotatable with respect to said apparatus body or said frame around a longitudinal axis of the apparatus; and
    a lifting member arranged to move the motor-driven tool diametrally within the tube;
    wherein said carrier member includes a carrier arm of springy material, for example spring steel, said carrier member is pivotally connected, opposite said motordriven tool, to said rotatable portion at a distance from said end part thereof, and
    wherein said lifting member is interposed between said end part of the rotatable portion and the pivot axis of the carrier arm, said pivot axis extends in a direction perpendicular to said longitudinal rotation axis of the apparatus.

2. Apparatus according to claim 1, wherein the rotatable portion comprises a mainly horizontally positioned cylindrical hollow part formed with an elongated upper opening, said carrier arm extends above and along the elongated upper opening from said pivot axis at an end of the elongated upper opening and beyond said end part of the rotatable portion, said lifting member comprises an inflatable elastic body arranged inside the cylindrical part and is cooperable with the carrier arm via the elongated upper opening for swinging the carrier arm outwardly by inflation of the elastic body and for swinging the carrier arm back by withdrawal of air from the inflatable body, and wherein the carrier arm is preferably spring-loaded in a direction towards the inflatable body.

3. Apparatus according to claim 2, wherein the carrier arm is curved or bent into such a shape that said motor driven tool, at an extreme end of the carrier am, may be placed on a level with or below said elongated upper opening.

4. Apparatus according to one of claims 1, 2, or 3, wherein the motor-driven tool is preferably pneumatically driven and is provided with a rotating cutting disc having a cutting plane extending in parallel with the carrier arm and at right angles to a radial plane through the tube.

5. Apparatus according to one of claims 1, 2 or 3, wherein the motor-driven tool is preferably pneumatically driven and is provided with a rotating grinding cone having an axis of rotation disposed at right angles to the carrier arm extending along a radial plane through the tube.

6. Apparatus according to one of claims 1, 2, or 3, wherein the motor-driven tool is preferably pneumatically driven and is provided with a reciprocating sawblade which runs in an extension of or in parallel with the carrier arm.

7. Apparatus according to one of claims 1 2, or 3, further comprising a turning motor for turning said rotatable portion, said turning motor comprising preferably an electric low-voltage motor encapsulated in a water-tight fashion and arranged so as to be able to turn the rotatable portion by 360° with respect to the frame.

8. Apparatus according to one of claims 1 2, or 3, further comprising a drive motor preferably placed opposite of the carrier arm with a frictional drive roller arranged so as to be pressed against a wall of the sewer tube by an air cylinder, said drive roller being spring-loaded in a direction away from the wall of the sewer tube.

* * * * *